April 23, 1935. W. E. KAWALLE 1,998,673

FLUID HEATER

Filed Oct. 23, 1933

Inventor
W. E. Kawalle
By Young & Young
Attorneys

Patented Apr. 23, 1935

1,998,673

UNITED STATES PATENT OFFICE 1,998,673

FLUID HEATER

William E. Kawalle, Manitowoc, Wis.

Application October 23, 1933, Serial No. 694,716

3 Claims. (Cl. 53—9)

This invention appertains to liquid heaters and more particularly to liquid heaters of the type which are adapted to be placed over a source of heat, such as a gas burner.

One of the primary objects of my invention is the provision of means whereby the temperature of a liquid within a vessel can be quickly raised with the expenditure of a minimum amount of heat.

Another salient object of my invention is the provision of a liquid heating vessel having a heating flue extending from the bottom wall thereof into and through the interior of the vessel, the flue acting as means for concentrating the heat from the burner and for distributing the heat to the liquid whereby the temperature of the liquid will be quickly raised.

A further important object of my invention is the provision of a liquid heating vessel having a substantially conical shaped heating flue rising from the bottom wall thereof into the interior of the vessel, the flue being provided with flutes or ribs, whereby to increase the heat radiating surface thereof to the liquid in the vessel.

A further object of my invention is the provision of a liquid vessel comprising a body having a substantially conical shaped heating flue extending from the bottom wall into the interior of the vessel, the upper end of the flue being provided with an outlet, whereby a draft will be caused through said flue to cause the flow of heated air through the flue and thereby bring about the quick heating of the liquid.

A still further object of my invention is to provide a liquid heating vessel of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawing, in which:—

Figure 1:
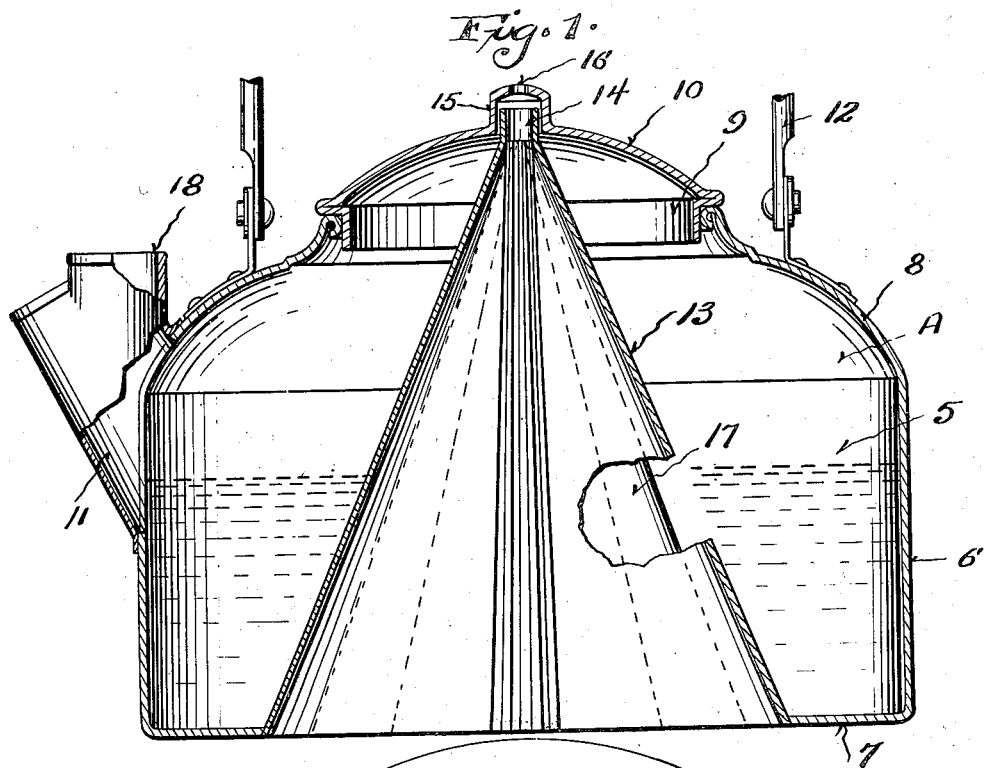
Figure 1 is a longitudinal section through a liquid heating vessel constructed in accordance with my invention.
Figure 2:
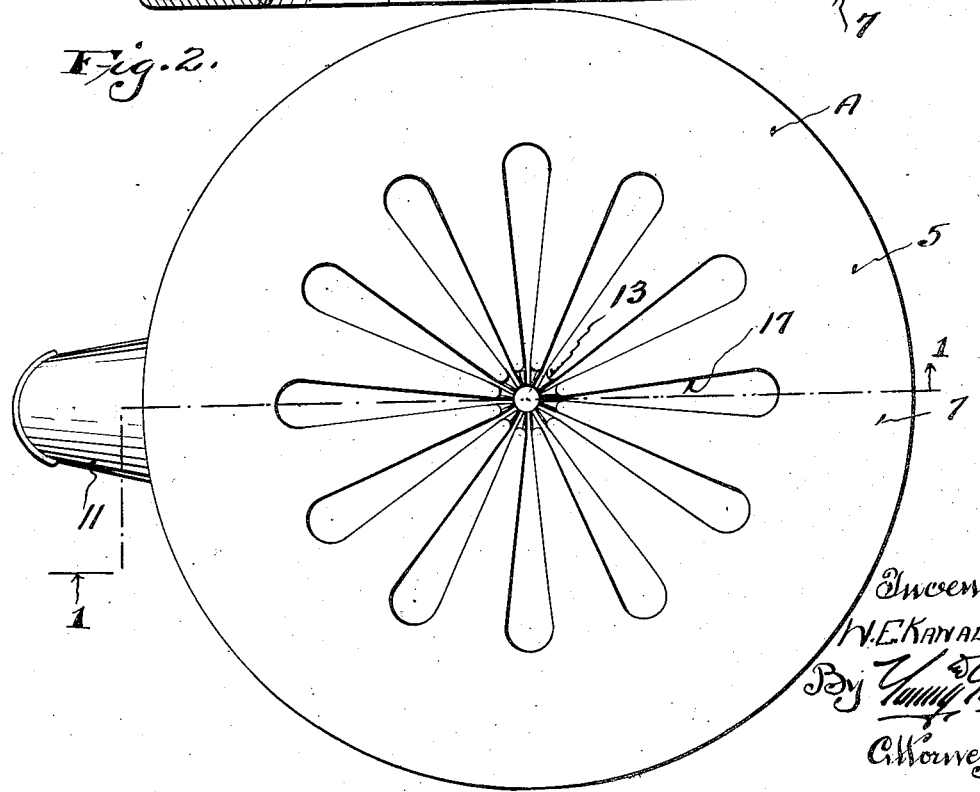
Figure 2 is a bottom plan view thereof.

Referring to the drawing in detail, wherein similar reference characters designate the corresponding parts throughout the several views, the letter A generally indicates a liquid heating vessel which, as shown, is of the teakettle type, but it is to be understood that the principles of my invention can be incorporated with any type of liquid heater. Thus, the teakettle has been illustrated only to show the application of one form of my invention.

The vessel A comprises a hollow body 5 having the cylindrical side wall 6 and the flat bottom wall 7. The cylindrical side wall 6 carries a dome shaped top wall 8, the central portion of which is left open as at 9 and normally closed by a cover 10. A pouring spout 11 extends from the side of the body and the top wall 8 can be provided with a pivoted bail handle 12.

In accordance with my invention, I provide a centrally disposed heating flue 13 which opens out through the bottom wall 7. This flue is connected to or formed on the bottom wall 7 in any preferred manner. As shown, the flue 13 is of a substantial conical shape and gradually tapers toward its upper end, which extends materially beyond the top wall 8. The extreme upper end of the flue 13 terminates in an outlet tube 14 which is received within an axially disposed hollow head 15 formed on the cover 10. This head 15 can form the handle for the cover and the same is provided with an outlet opening 16.

It is to be noted that the diameter of the tube 14 is slightly less than the interior diameter of the head 15, so that steam arising from the liquid being heated can also escape through said opening 16.

In order to increase the radiating surface of the flue 13, the same is provided at equidistantly spaced points with longitudinally extending flutes 17 and obviously, the liquid being heated can circulate between and around said flutes.

In use of my improved liquid heating vessel, the same is placed over the source of heat in the ordinary manner and the heat will not only act on the bottom wall 7 to raise the temperature of the water, but will also flow into the heating flue 13. The heating flue 13 acts as means for concentrating the heat and the heat will quickly raise the temperature thereof which is transferred to the liquid being heated. This results in the temperature of the liquid being quickly raised with the expenditure of a minimum amount of heat.

Due to the fact that the upper end of the flue is open, a slight draft will be created through the flue which also tends to permit the flow of heat within the flue from the burner.

The pouring spout 11 may be provided with a filling nipple 18 and this nipple facilitates the filling of the vessel with water or the like without necessitating the removal of the cover 10.

From the foregoing description, it can be seen that I have provided a novel and efficient liquid heater in which means is provided for efficiently radiating the heat to the liquid.

Changes in details may be made without departing from the spirit or the scope of this invention, but what I claim as new is:

1. A liquid heating vessel comprising a cylindrical side wall, a bottom wall and a dome shaped top wall having a central opening, a cover normally closing said opening provided with a hollow axial knob, and a tapered heat concentrating flue carried by the bottom wall and opening out through the lower face thereof, said flue extending into the interior of the body and through the opening in the top wall thereof, the flue being provided with an open upper end extending into the hollow knob, said knob being provided with an outlet opening.

2. A liquid heating vessel comprising a body having a bottom wall and a top wall provided with an enlarged opening, a cover normally closing said opening provided with a hollow knob having an outlet, and a tapered head, a concentrating flue carried by the bottom wall and opening out through the lower face thereof, an outlet nipple formed on the tapered upper end of said flue extending into the knob, the top being provided with a plurality of equidistantly spaced flutes.

3. A liquid heating vessel comprising, a body having a bottom wall, a side wall and a top wall provided with an enlarged opening, a removable cover for said opening having a steam escape outlet, a plurality of radially extending interconnected heating flues in the body carried by and opening out through the bottom wall, all of said flues uniformly tapering toward their upper ends, and a heat escape outlet tube connecting the upper ends of all of said flues terminating adjacent to the steam escape outlet in the cover.

WILLIAM E. KAWALLE.